United States Patent
Romano et al.

(10) Patent No.: US 11,248,744 B2
(45) Date of Patent: Feb. 15, 2022

(54) MONITORING DEVICE FOR MONITORING A BOUNDARY SECTION OF A SAFETY ZONE

(71) Applicant: OMRON EUROPE B.V., Hoofddorp (NL)

(72) Inventors: Enzo Romano, Poirino (IT); Paolo Viviani, Poirino (IT); Gianmarco Grange, Poirino (IT)

(73) Assignee: OMRON EUROPE B.V., Hoofddorp (NL)

( * ) Notice: Subject to any disclaimer, the term of this patent is extended or adjusted under 35 U.S.C. 154(b) by 0 days.

(21) Appl. No.: 16/968,488

(22) PCT Filed: Feb. 6, 2019

(86) PCT No.: PCT/EP2019/052916
§ 371 (c)(1),
(2) Date: Aug. 7, 2020

(87) PCT Pub. No.: WO2019/154862
PCT Pub. Date: Aug. 15, 2019

(65) Prior Publication Data
US 2020/0400275 A1      Dec. 24, 2020

(30) Foreign Application Priority Data
Feb. 8, 2018      (IT) ................... IT102018000002494

(51) Int. Cl.
*F16P 3/14*      (2006.01)
*B25J 19/02*      (2006.01)
*G01P 3/68*      (2006.01)

(52) U.S. Cl.
CPC ............. *F16P 3/144* (2013.01); *B25J 19/021* (2013.01); *G01P 3/68* (2013.01)

(58) Field of Classification Search
CPC ............ F16P 3/144; B25J 19/021; G01P 3/68
See application file for complete search history.

(56) References Cited

U.S. PATENT DOCUMENTS

| | | | |
|---|---|---|---|
| 10,215,852 B1 * | 2/2019 | Byrne | ..................... G01S 13/87 |
| 2011/0298579 A1 * | 12/2011 | Hardegger | .............. G01S 17/10 |
| | | | 340/3.1 |

(Continued)

FOREIGN PATENT DOCUMENTS

| | | |
|---|---|---|
| DE | 4233810 C2 | 2/2000 |
| DE | 202004020863 U1 | 5/2006 |

(Continued)

OTHER PUBLICATIONS

International Search Report for corresponding International Application No. PCT/EP2019/052916, dated Feb. 5, 2019.

*Primary Examiner* — Carlos Amaya
(74) *Attorney, Agent, or Firm* — Cantor Colburn LLP

(57) ABSTRACT

A monitoring device for monitoring a boundary section of a safety zone for detecting an object at least partially entering or leaving the safety zone through the boundary section is provided. The monitoring device comprises: a light curtain device for detecting an object touching the boundary section; at least one radar device for detecting a movement direction of the object relative to the boundary section and/or a material property of the object; and an evaluation device for emitting an evaluation result based on a radar device signal from the radar device and optionally based on a light curtain device signal from the light curtain device.

14 Claims, 9 Drawing Sheets

(56) References Cited

FOREIGN PATENT DOCUMENTS

| DE | 102010050547 A1 | 5/2012 |
|----|-----------------|--------|
| DE | 102012007520 B3 | 8/2013 |
| WO | 0159473 A2 | 8/2001 |

* cited by examiner

MONITORING DEVICE FOR MONITORING A BOUNDARY SECTION OF A SAFETY ZONE

CROSS REFERENCE TO RELATED APPLICATIONS

This is the U.S. national stage of application No. PCT/EP2019/052916, filed on Feb. 6, 2019. Priority under 35 U.S.C. § 119(a) and 35 U.S.C. § 365(b) is claimed from Italian Application No. 102018000002494, filed Feb. 8, 2018, the disclosure of which is also incorporated herein by reference.

The present invention relates to a monitoring device for monitoring a boundary section of a safety zone and to a method for monitoring such a boundary section.

Light curtain devices can be used to detect the presence of an object along a boundary section of a safety zone. When an object is detected, a warning signal may be emitted. For example, a light curtain device can be arranged at a boundary of a dangerous zone of a manufacturing site to detect that a human is passing the boundary of the dangerous zone. It can be desired to obtain further information about the boundary section of the safety zone to thereby improve the monitoring of said boundary section.

The document DE 10 2012 007 520 B3 discloses combinations of different sensors that are chosen such as to fulfill given detection purposes. As an example, it is suggested to monitor a zone around a forklift using two laser scanners and a radar. However, in DE 10 2012 007 520 B3, the various sensors are used to monitor entire zones and a monitoring of a boundary section of a safety zone is not addressed.

Document DE 42 33 810 C2 discloses a monitoring device for a work machine which comprises a light curtain for detecting an object or a person entering a work area of the work machine. The monitoring device further includes a rotating scanning device for detecting a presence of an object or a person within the work area.

Further, document DE 20 2004 020 863 U1 discloses a monitoring apparatus for monitoring an area comprising a dangerous machine located in a dangerous area. The monitoring apparatus comprises a light curtain and a protection device which is implemented as a laser scanner.

It is one object of the present invention to provide an improved monitoring of a boundary section of a safety zone.

Accordingly, a monitoring device for monitoring a boundary section of a safety zone for detecting an object at least partially entering or leaving the safety zone through the boundary section is provided. The monitoring device comprises:

a light curtain device for detecting an object touching the boundary section;

at least one radar device for detecting a movement direction of the object relative to the boundary section and/or a material property of the object; and an evaluation device for emitting an evaluation result based on a radar device signal from the radar device and optionally based on a light curtain device signal from the light curtain device.

The safety zone can be a three dimensional or two-dimensional region. It may be at least partially delimited by the boundary section. In embodiments, the safety zone is a dangerous zone, for example a dangerous zone of a factory arrangement comprising a dangerous factory device. The safety zone can be a virtual zone, which does not have any physical boundaries.

The boundary section may be a two-dimensional area or a one-dimensional line. For example, the boundary section is a plane delimiting the safety zone. The boundary section can be the boundary between the inside of the safety zone and the outside of the safety zone. In particular, the boundary section delimits a dangerous zone from a non-dangerous zone. The boundary section may also be a virtual area which is not defined by any physical boundaries.

The object can be any type of visible item. For example, it can be a manufactured object, a human, a vehicle or the like.

The light curtain device may detect whether any object is touching the boundary section or not. It can be considered that an object is touching the boundary section if any part thereof is in contact with the boundary section. In particular, an object that crosses the boundary section touches the boundary section. For example, the object has to touch the boundary section to at least partially enter or leave the safety zone. The light curtain device can be arranged along the boundary section, in particular at an edge of the boundary section.

To detect the presence of an object touching the boundary section, the light curtain device can comprise a light emitting element for emitting light beams, for example in a pulsed manner at predetermined frequency, as well as a light receiving element for receiving only light at the predetermined frequency. When the power of the light emitted by the light emitting element changes, for example due to the presence of an object touching the boundary section, the light curtain device recognizes the presence of the object touching the boundary section.

The light emitting element can emit the light along the boundary section, in particular such that the light is emitted along a grid that coincides with the boundary section. In embodiments, the light emitting element is arranged on one side of the boundary section and the light receiving element is arranged on the other side of the boundary section. The light curtain device may determine the light curtain device signal, which for example indicates whether an object touches the boundary section or not.

The radar device can be a device that uses radar waves for detecting the distance between the radar device and an object, and/or an angle between a reference plane of the radar device and the object. In particular, a 3D position of the object can be determined by combining the information about the distance and angle of the object. The position of the object can be expressed relative to the boundary section. The movement direction of the object relative to the boundary section can be determined by analysing subsequent positions of the object. In particular, the radar device is configured to perform a three-dimensional monitoring of a zone monitored by the radar device.

The radar device may further be used to detect the material property of the object. The material property of the object can for example be whether the object is made of wood, plastic, metal, paper, cardboard or if it is a human or an animal. This material property may be part of the radar device signal.

The radar device can comprise a radar emitter for emitting the radar waves and a radar receiver for receiving the radar waves. In particular, the radar receiver receives radar waves that are reflected by the object and are indicative of the position, movement direction and/or material property of the object.

For example, the size of the radar wave received by the radar receiver can vary depending on the permittivity of the object. An analysis of the radar waves received by the radar receiver may allow to determine the permittivity of the object. In particular, the material out of which the object is made can be determined from its permittivity.

The radar device signal can be determined by the radar device and may indicate the position of the object, the movement direction of the object relative to the boundary section and/or the material property of the object. The movement direction relative to the boundary section for example indicates whether the objects moves towards the boundary section or away from the boundary section.

The radar waves emitted by the radar device may have frequencies ranging between 18 GHz and 40 GHz, in particular between 20 GHz and 30 GHz.

The evaluation device can receive the radar device signal from the radar device and/or the light curtain device signal from the light curtain device. The evaluation device may evaluate this or these receives signal(s) and determine the evaluation result based thereon.

In particular, the light curtain device and the radar device are used in combination to monitor the boundary section of the safety zone. The radar device may allow to monitor not only the boundary section itself but also its surroundings. Thereby, objects approaching the boundary section may be detected and it can be possible to predict critical events occurring at the boundary section such as crossings of the boundary section. The monitoring of the safety zone can thereby be improved. In particular, it can be prevented that an object enters the safety zone more reliably.

According to an embodiment, the monitoring device further comprises a protection device for emitting a warning signal and/or performing a predetermined protective measure based on the evaluation result.

The evaluation device can send the evaluation result to the protection device. The protection device may take a decision regarding a protective measure to be taken in view of the evaluation result. For example, if the evaluation result indicates an immediate danger, the protection device can perform an emergency protective measure. This can be the case when the result indicates that an object is entering the safety zone. In this case, the evaluation device may, as a protective measure, turn off and/or slow down any dangerous facilities (such as factory devices) located in the safety zone to avoid damaging the entering object. The evaluation device can also, as another protective measure, provide a physical barrier to prevent the object from attaining the dangerous facilities of the safety zone.

Depending on the evaluation result, the protection device can take different types of predetermined protective measures. In particular, the protection device determines the predetermined protective measure in accordance with the evaluation result. The protection device can also choose to take no actions if the evaluation result is not critical, in particular if no object is detected at or close to the boundary section.

The emission of the warning signal can be an example of a predetermined protective measure. The warning signal can be a light signal or a sound signal.

The protection device allows to protect the boundary section, the safety zone and/or the object by taking appropriate protective measures depending on the evaluation result.

According to a further embodiment, the monitoring device further comprises a muting device for temporarily deactivating the protection device and/or the light curtain device as a function of the evaluation result.

The process of temporarily deactivating the protection device and/or the light curtain device performed by the muting device can be called "muting". The muting function may be performed when the monitoring device recognizes that no critical event is occurring or about to occur. The muting can prevent the protection device from unnecessarily performing the predetermined protective measure. For example, the muting can be activated when the monitoring device recognises, based on the evaluation result, that the object passing the boundary section is leaving the safety zone, that the object is a non-critical object and/or when the object moves at a predetermined speed. Further, muting can be performed when the material property of the object as detected by the radar device indicates that the object is made of plastic or wood, while it may be deactivated when the material property of the object as detected by the radar device indicates that the object is a human, in particular when a human enters the safety zone. Taking into account the material property of the object may thus improve the monitoring of the boundary section.

In embodiments, the muting device performs the muting function when the object is detected in a muting zone. Said muting zone can be within the safety zone. In particular, the muting zone touches the boundary section.

In embodiment, the muting device does not perform the muting function when the object is detected in an alarm zone. Said alarm zone can be outside the safety zone. In particular, the alarm zone touches the boundary section.

According to a further embodiment, the evaluation result indicates whether the object is inside or outside the safety zone, the movement direction of the object relative to the boundary section as detected by the radar device and/or whether the object is touching the boundary section.

In particular, the evaluation result indicates whether the object is inside or outside the safety zone based on the position of the object determined by the radar device. For example, an object that is inside the safety zone can be a product that is being manufactured while an object outside the safety zone can be a human, in particular a technician, in the case that the safety zone is a dangerous zone of a factory arrangement or manufacturing site. The evaluation result can also indicate whether the object is located within the muting zone or the alarm zone.

The movement direction of the object relative to the boundary section for example indicates whether the object is moving towards or away from the boundary section. In particular, it can indicate whether the object is about to leave or to enter the safety zone through the boundary section or whether the object is entering or leaving the safety zone through the boundary section.

The indication that the object is touching the boundary may be derived from the light curtain device signal from the light curtain device.

According to a further embodiment, the radar device has a detection region, wherein the radar device and the light curtain device are arranged such that the detection region at least partially overlaps with the boundary section.

In particular, the detection region of the radar device is the region that is reached by the radar waves and in which the radar device can detect the position of an object and/or a movement direction of the object relative to the boundary section. The detection region may have an ellipsoidal shape.

According to a further embodiment, the boundary section is covered by the detection region. In particular, the boundary section is entirely within the detection region.

According to a further embodiment, the detection region has an elongated shape with a detection axis, and the radar device and the light curtain device are arranged such that the detection axis runs parallel to the boundary section.

In particular, the radar and the light curtain device are arranged together on one side of the boundary section. A main direction along which the radar device emits the radar signal, which can correspond to the detection axis, can be parallel to a main direction along which the light curtain device emits the light signal. The detection region may be symmetric around the detection axis.

According to a further embodiment, the detection region has an elongated shape with a detection axis, and the radar device and the light curtain device are arranged such that the detection axis runs perpendicular to the boundary section.

In particular, the light curtain device and the radar device are not arranged at the same geometric position with respect to the safety zone. In embodiments, the radar device is arranged within or outside the safety zone.

According to a further embodiment, the light curtain device comprises a plurality of light emitting elements arranged on or at a first support element and a plurality of light receiving elements arranged on or at a second support element, the boundary section being between the support elements. In particular, the light emitting elements emit light along the boundary section.

According to a further embodiment, the radar device comprises a radar sender and a radar receiver, the radar sender and the radar receiver being arranged at or on at least one of the first and/or second support element.

In particular, the radar sender and/or the radar receiver can be arranged on the same support element as the light emitting elements and/or the light receiving elements. The radar sender and radar receiver may be positioned on the same support element.

According to a further embodiment, the radar device comprises a radar sender and a radar receiver, the radar sender and the radar receiver being arranged at a predetermined distance from the first and the second support element.

According to a further embodiment, the safety zone is situated between the radar device and the light curtain device. In particular, the radar device and the light curtain device are arranged such that the safety zone is located therebetween.

According to a second aspect, a factory arrangement is provided. The factory arrangement comprises:
 a safety zone delimited by at least one boundary section, wherein, in the safety zone, at least one factory device is arranged and implemented to perform a predetermined function; and
 a monitoring device according to the first aspect or according to an embodiment of the first aspect, implemented to detect if an object at least partially enters or leaves the safety zone through the boundary section.

For example, the factory device is a manufacturing device, a conveyor belt or a packing device. It can comprise dangerous elements such as saws, drills, laser cutters and the like. The factory device can be used to manufacture objects such as metal, plastic or wood objects and/or to pack them in boxes, for example in cardboard boxes. In particular, it should be avoided that a human enters in contact with the dangerous elements of the factory device as the human may injure himself. The safety of the human may be provided by the monitoring device already described above. In particular, when a box leaves the safety zone, there is no danger and muting is performed. Alternatively, when a human is about to enter the safety zone, the monitoring device may recognize the danger and not perform the muting.

According to a third aspect, a method for monitoring a boundary section of a safety zone is provided. The method comprises:
 operating a light curtain device to detect if an object touches the boundary section; and
 contemporaneously operating at least one radar device for detecting a movement direction of the object relative to the boundary section and/or a material property of the object; and
 emitting an evaluation result based on a radar device signal from the radar device and optionally based on a light curtain device signal from the light curtain device.

The embodiments and features described with reference to the monitoring device according to the first aspect or according to an embodiment of the first aspect apply mutatis mutandis to the factory arrangement according to the second aspect and to the method according to the third aspect.

Further possible implementations or alternative solutions of the invention also encompass combinations that are not explicitly mentioned herein of features described above or below with regard to the embodiments. The person skilled in the art may also add individual or isolated aspects and features to the most basic form of the invention.

Further embodiments, features and advantages of the present invention will become apparent from the subsequent description and dependent claims, taken in conjunction with the accompanying drawings, in which:

In the Figures, like reference numerals designate like or functionally equivalent elements, unless otherwise indicated.

Figure 1:
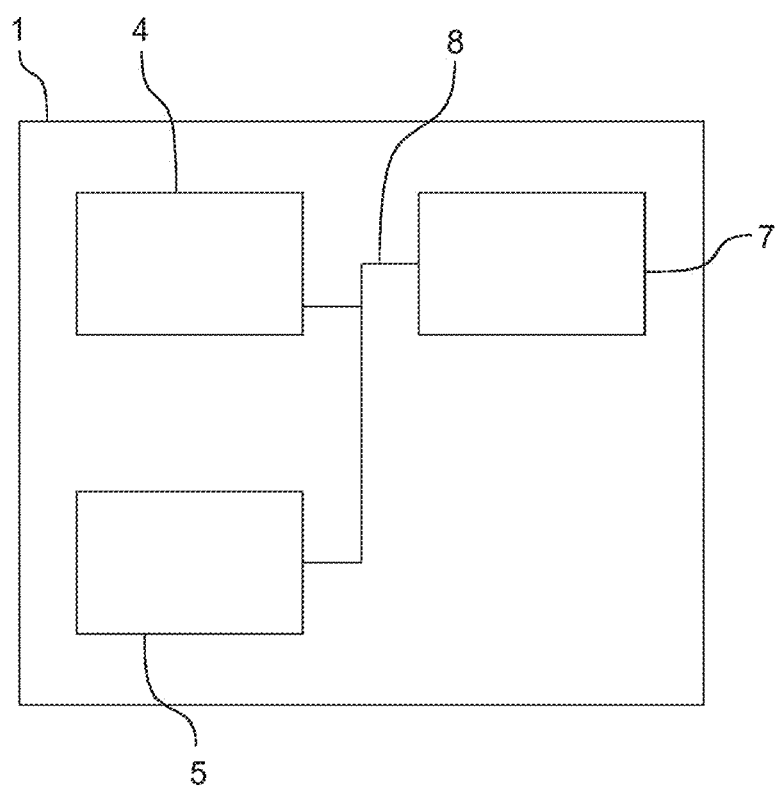
FIG. 1 shows a monitoring device according to a first embodiment.

FIG. 1 shows a monitoring device 1 according to a first embodiment. The monitoring device 1 comprises a light curtain device 4, a radar device 5 and an evaluation device 7 which are connected to one another through cables 8. The functionality of the monitoring device 1 will be described in view of FIG. 2, which shows a factory arrangement 10 according to a first embodiment.

Figure 2:
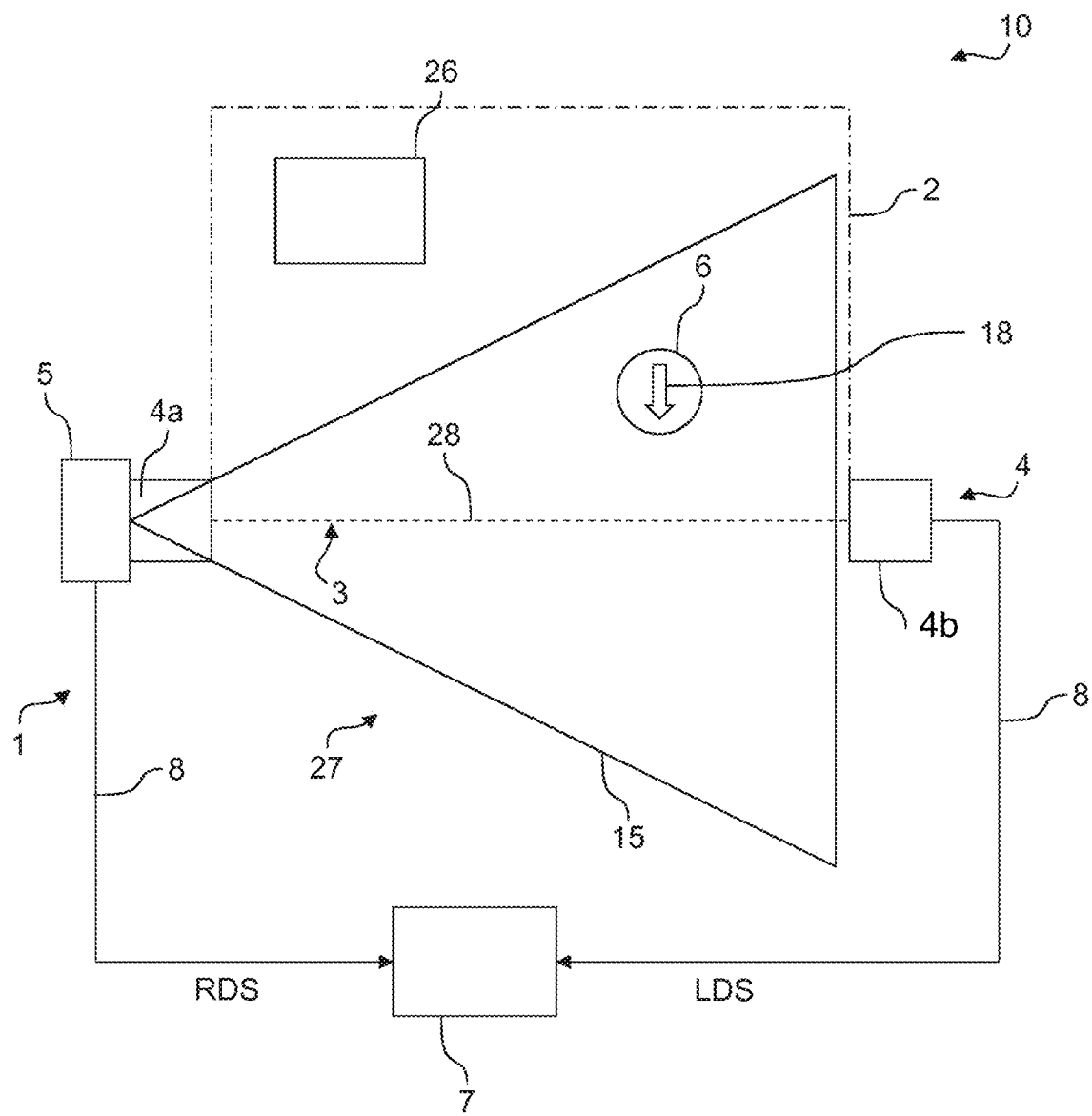
FIG. 2 shows a factory arrangement according to a first embodiment.

The factory arrangement 10 comprises the monitoring device 1 of FIG. 1. In FIG. 2, the factory arrangement 10 is viewed from above. The monitoring device 1 is used to monitor a boundary section 3 of a safety zone 2. The safety zone 2 corresponds to a dangerous zone comprising a dangerous factory device 26. In the present example, the factory device 26 is a laser cutter used to cut objects to be manufactured. It is desired that humans, for example technicians, stay outside the safety zone 2 to avoid getting injured by the laser cutter 26. The safety zone 2 is a virtual cuboid that is delimited by the boundary section 3 on one side. The boundary section 3 is a plane. In FIG. 2, the boundary section 3 is represented as a dashed line while the remaining boundaries of the safety zone 2 are represented by dashed-and-dotted lines.

The light curtain device 4 comprises a light emitting element 4a and a light receiving element 4b arranged with the boundary section 3 therebetween. The light emitting element 4a emits light as a light beam 9 along the boundary section 3. The light receiving element 4b receives the light emitted by the light emitting element 4a. Depending on the frequency of the light received by the light receiving element 4b, it can be determined whether an object 6 touches the light beam 9 and hence the boundary section 3. In FIG. 2, the object 6 is not touching the boundary section 3.

The radar device 5 is used contemporaneously to the light curtain device 4. The radar device 5 monitors a detection region 15 using radar waves. The detection region has a conical shape with a detection axis 28 along the boundary section 3. When the object 6 is within the detection region 15, the radar device 5 can detect its position and a movement direction of the object 6 relative to the boundary section 3. For the object 6 of FIG. 2, the radar device 5 determines that the object is in the dangerous zone 2 and that it is moving towards a non-dangerous zone 27 outside the dangerous zone 2. In FIG. 2, the movement direction of the object 6 is indicated by the direction arrow 18.

The object 6 is an object that is being manufactured by the laser cutter 26 but has unintentionally been dropped.

A detection signal of the light curtain device 4, also called light curtain device signal (LDS), is sent to the evaluation unit 7 by the light curtain device 4 for evaluation. A detection signal of the radar device 5, also called radar device signal (RDS), is sent to the evaluation unit 7 by the radar device 5 for evaluation. The evaluation unit 7 evaluates the two signals LDS, RDS and determines and emits an evaluation result based thereon. The evaluation result indicates whether the object 6 is inside or outside the safety zone 2, whether the object 6 moves towards the boundary section 3 or away from it, and whether the object touches the boundary section 3 or not. In the example shown in FIG. 2, the evaluation result indicates that the object 6 is in the safety zone 2 moving towards the boundary section 3 but not touching the boundary section 3 (yet).

Figure 3:
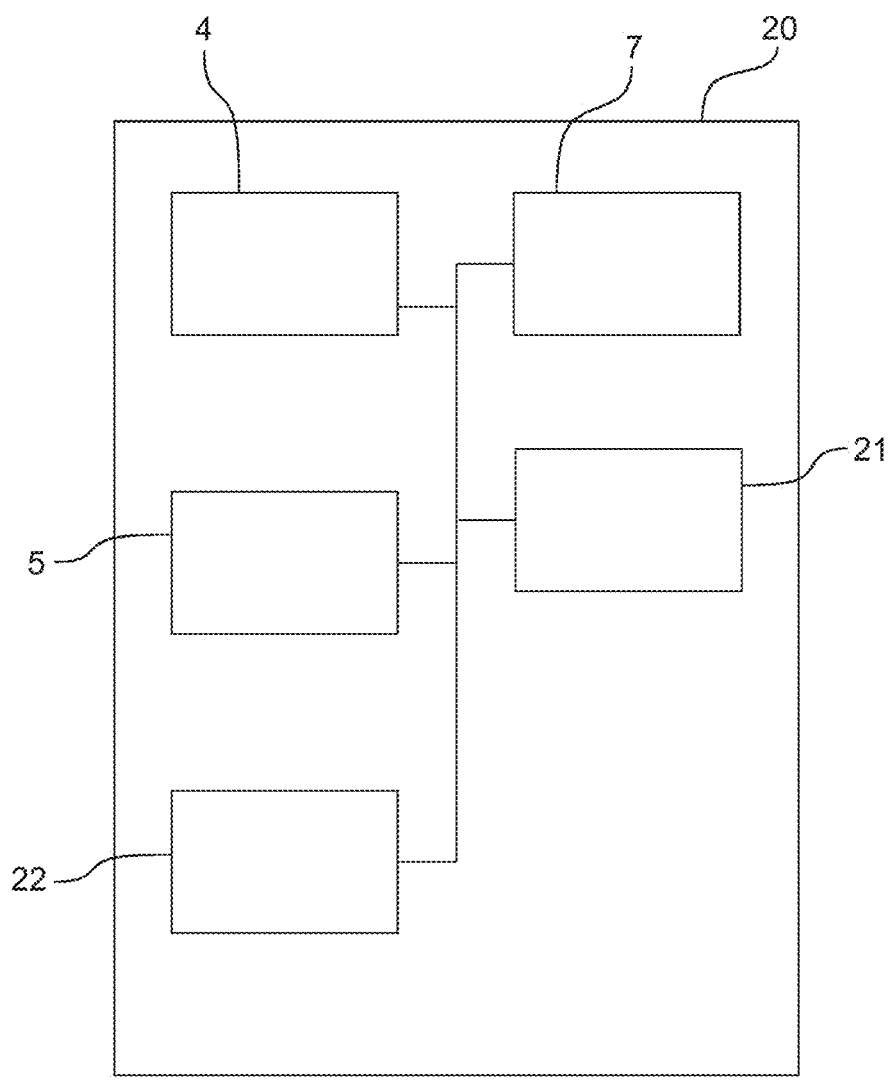
FIG. 3 shows a monitoring device according to a second embodiment.

FIG. 3 shows a monitoring device 20 according to a second embodiment. The monitoring device 20 according to the second embodiment differs from the monitoring device 1 according to the first embodiment in that it further comprises a protection device 21 and a muting device 22, the functions of which will be described in the following with reference to FIGS. 4 to 7B.

Figure 4:
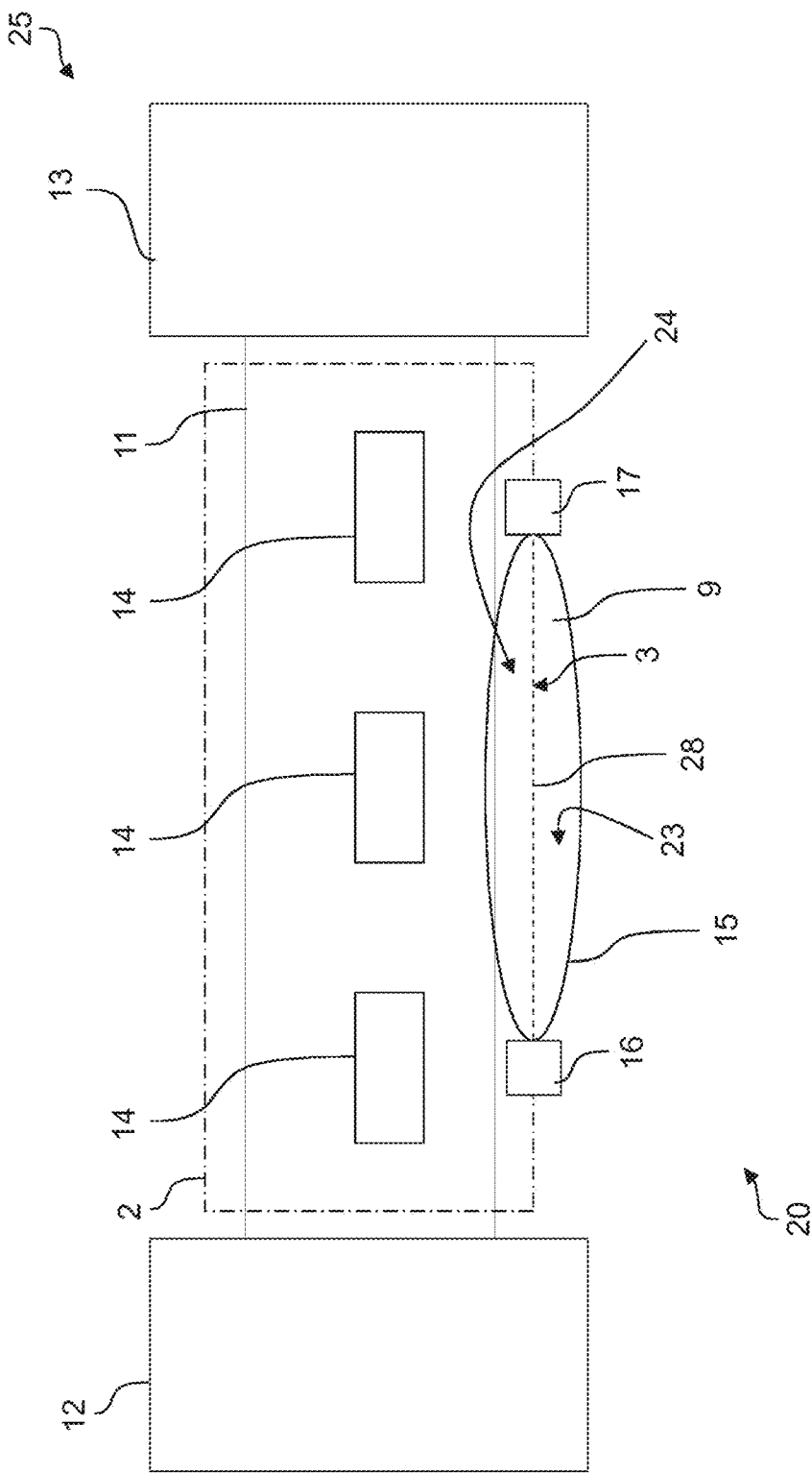
FIG. 4 shows a factory arrangement according to a second embodiment.

FIG. 4 shows a factory arrangement 25 according to a second embodiment. The factory arrangement 25 comprises the monitoring device 20 according to the second embodiment. The factory arrangement 25 according to the second embodiment differs from the factory arrangement 10 according to the first embodiment in that the factory device 11 is a conveyor belt for bringing objects 14 from a first part 12 to a second part 13 of the factory arrangement 25. In the second embodiment, the objects 14 are boxes. The conveyor belt 11 is within the safety zone or dangerous zone 2.

Figure 5:
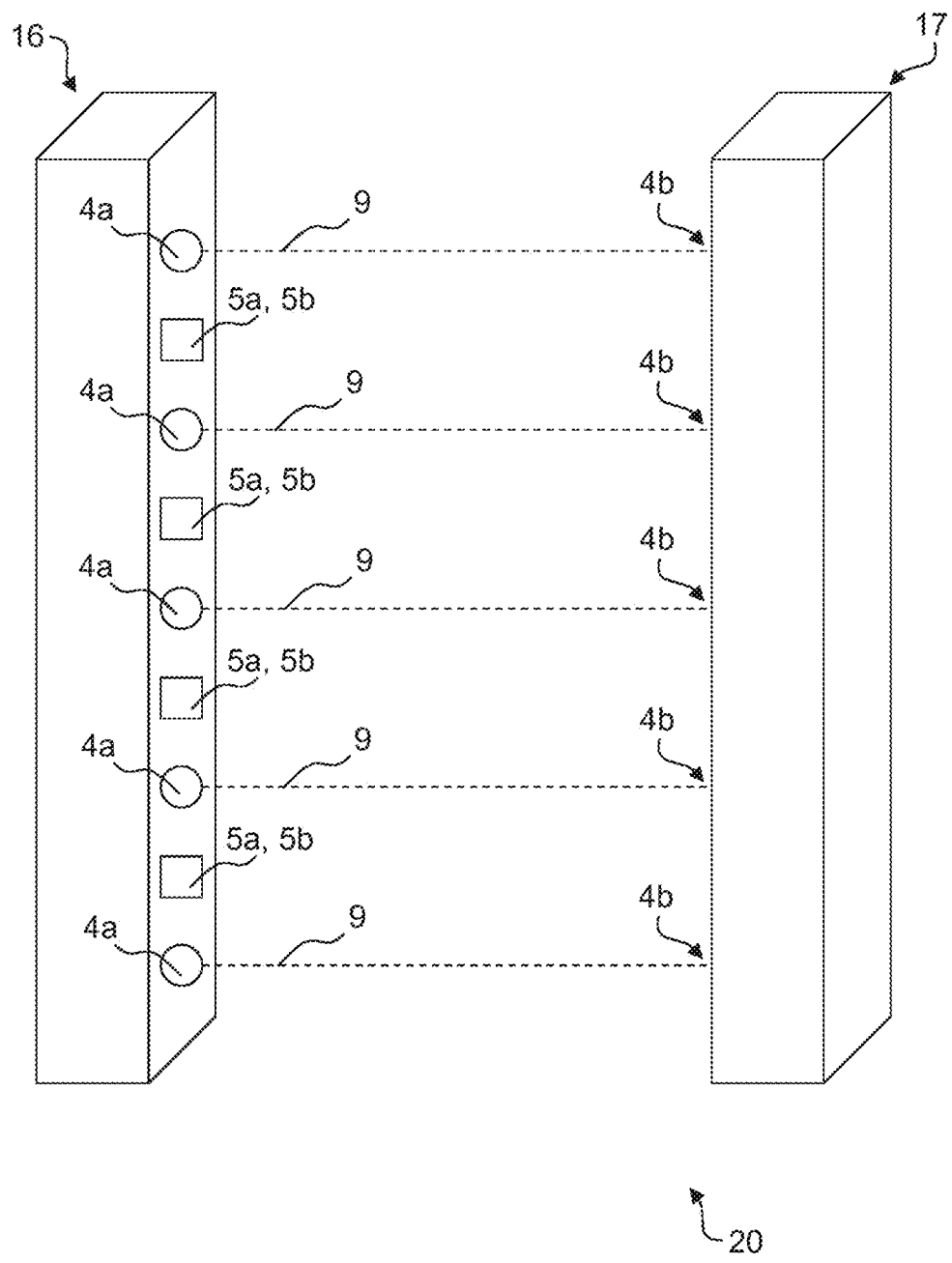
FIG. 5 shows a detailed view of the monitoring device according to the second embodiment.

As shown in FIGS. 4 and 5, the monitoring device 20 comprises a first support element 16 and a second support element 17. The first support element 16 comprises five identical light emitting elements 4a arranged at regular intervals and each emitting light as a light beam 9 along the boundary section 3. Correspondingly, the second support element 17 comprises five identical light receiving elements 4b arranged at regular intervals for detecting the light emitted from the respective light emitting elements 4a.

Additionally, the first support element 16 comprises four radar devices 5, each comprising a radar sender 5a and a radar receiver 5b. The radar sender 5a and the radar receiver 5b are located very close to one another. The radar senders 5a send the radar waves along the detection zone 15, which here has an ellipsoidal shape. The radar receivers 5b receive the emitted radar waves coming back. The received signal depends on whether an object 14 is located within the detection zone 15, on the position of such an object 14 and/or on its movement direction.

The monitoring device 20 allows to distinguish between objects located in an alarm zone 23 and objects located in a muting zone 24, as will be described below. The alarm zone 23 corresponds to the half of the detection zone 15 which is located on the outside of the safety zone 2 while the muting zone 24 corresponds to the half of the detection zone 15 which is located within the safety zone 2.

Referring to FIGS. 6A, 6B, 7A and 7B, it will be described how the monitoring device 20 according to the second embodiment is used to monitor the boundary section 3. In the FIGS. 6A, 6B, 7A and 7B, the conveyor belt 11 is not shown for clarity reasons, but it is understood that the factory arrangement 25 is the same in FIGS. 6A, 6B, 7A and 7B as in FIG. 4.

Figure 6A:
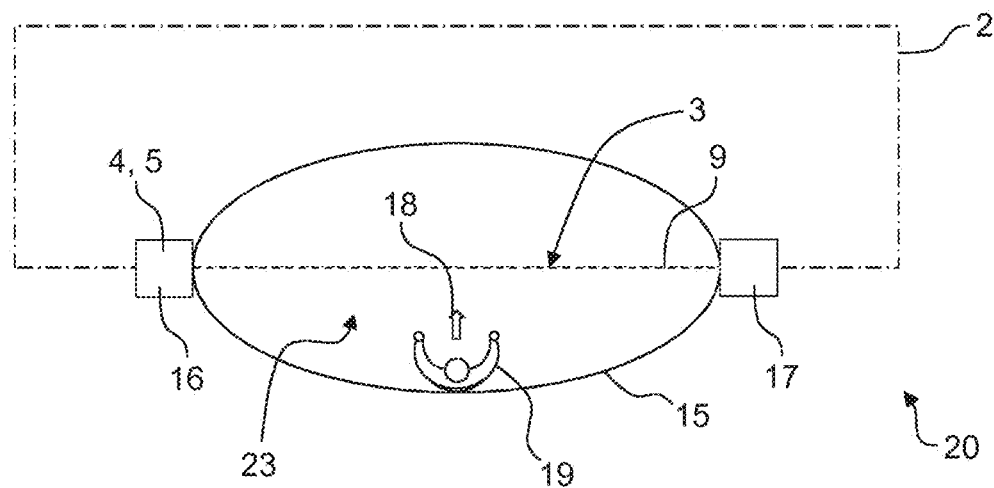
FIG. 6A shows a view of a first example of an object detected by the monitoring device according to the second embodiment.

In FIG. 6A, an object 19 moves towards the safety zone 2 along the direction 18. The object 19 is a human. The position of the human 19 and his movement direction is detected by the radar device 5 provided in the first support element 16 because the human 19 is within the detection region 15. In the present case, the evaluation device 7 determines, as an evaluation result, that the human 19 is in the alarm zone 23 of the detection region 15 (i.e. in the bottom half of the detection region 15 in FIG. 6A) and that it is moving towards the boundary section 3.

When the evaluation result indicates the presence of an object in the alarm zone, the protection device 21 performs a predetermined protective measure. Indeed, there is a risk that the human 19 crosses the boundary section 13 and enters the dangerous safety zone 2. The protection device 21 here emits an alarm, in particular a sound signal, as a protective measure to indicate the danger. When hearing the sound signal, it is expected that the human 19 stops and turns around before entering the dangerous zone 2.

Figure 6B:
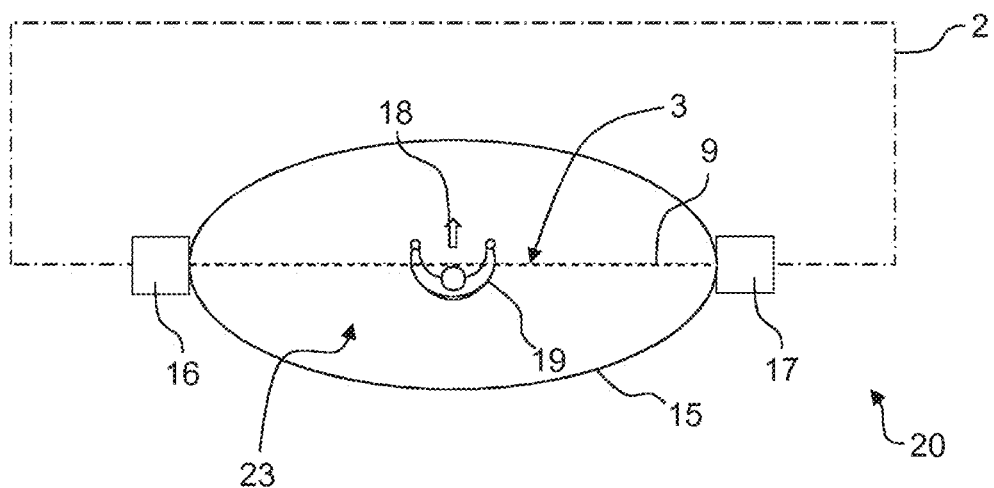
FIG. 6B shows another view of the first example of the object detected by the monitoring device according to the second embodiment

It is however possible that the human 19 does not stop and turn around despite the warning alarm (see FIG. 6B). In this case, the human 19 can go as far as to touch the boundary section 3. When he touches the boundary section 3, the light curtain device 4 sends a light curtain device signal LDS to the evaluation device 7 indicating that an object 19 is touching the boundary section 3. In parallel, the radar device 5 sends a radar device signal RDS indicating that the object 19 moves towards the dangerous zone 2. The evaluation device 7 combines the received information to obtain an evaluation result indicating that the object 19 is touching the boundary section 3 and that the object 19 moves towards the dangerous zone 2.

Based on this evaluation result, the protection device 21 recognizes an immediate danger and turns off the dangerous factory device 11 to avoid the human 19 getting injured.

Thus, depending on the position and movement direction of the human 19, the monitoring device 20 takes appropriate protective measures to avoid the human 19 getting injured. In addition, the factory device 11 is only turned off when it is necessary.

Figure 7A:
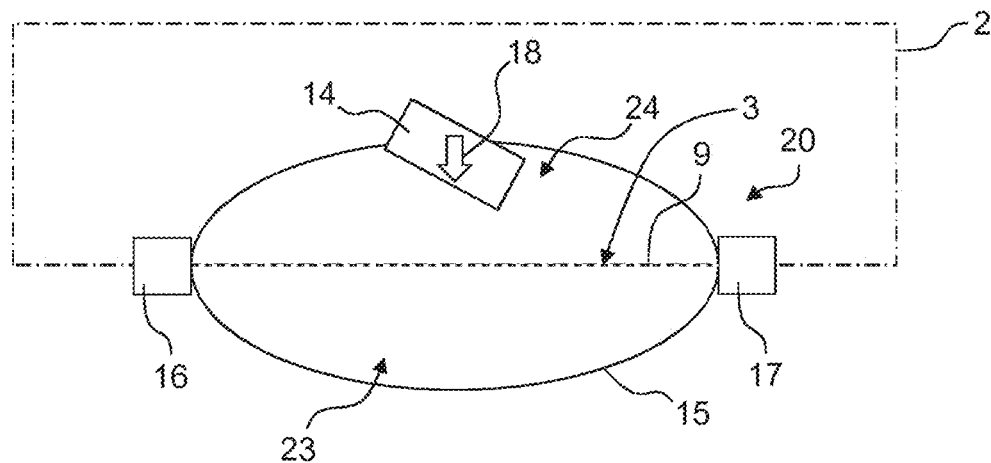
FIG. 7A shows a view of a second example of an object detected by the monitoring device according to the second embodiment.
Figure 7B:
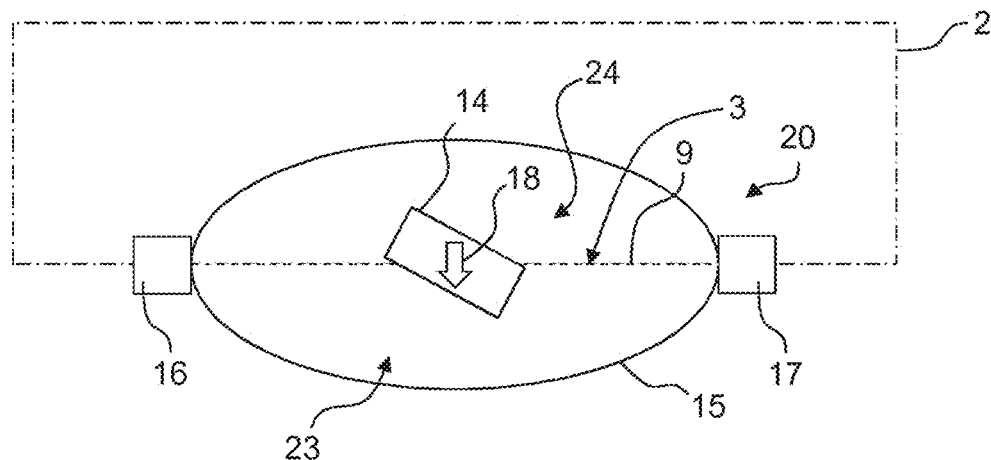
FIG. 7B shows another view of the second example of the object detected by the monitoring device according to the second embodiment

FIGS. 7A and 7B show an example in which a box 14 is leaving the dangerous area 2. It can happen that a box 14 falls from the conveyor belt 11, thereby causing it to cross the boundary section 3 and to leave the dangerous zone 2.

In FIG. 7A, the radar device 5 detects that an object 14 is located in the muting zone 24 of the detection region 15 and that it moves towards boundary section 3. The light curtain device 4 does not detect the presence of the object 14 touching the boundary section 3. Thus, the evaluation result indicates that the object 14 is located in the muting zone 24 and approaching the boundary section 3.

This evaluation result causes the muting device 22 of the monitoring device 20 to perform a muting function. This means that the muting device 22 temporarily deactivates the light curtain device 4. Indeed, there is no danger when the box 14 falls out of the safety zone 2 and it is hence unnecessary to turn off the conveyor belt 11.

When muting is activated, no protective measures are taken when an object 14 touches the boundary section 3, as shown in FIG. 7B. Indeed, as shown in FIG. 7B, when the box 14 passes the boundary section 3, no alarm is emitted by the protection device 21 and the conveyor belt 11 is not turned off either. This is advantageous because the conveyor belt 11 is not unnecessarily turned off when there is no real danger.

The muting is for example deactivated when the monitoring device 20 detects that the object 14 has completely passed the boundary section 3 and/or is moving away from the boundary section 3.

Figure 8A:
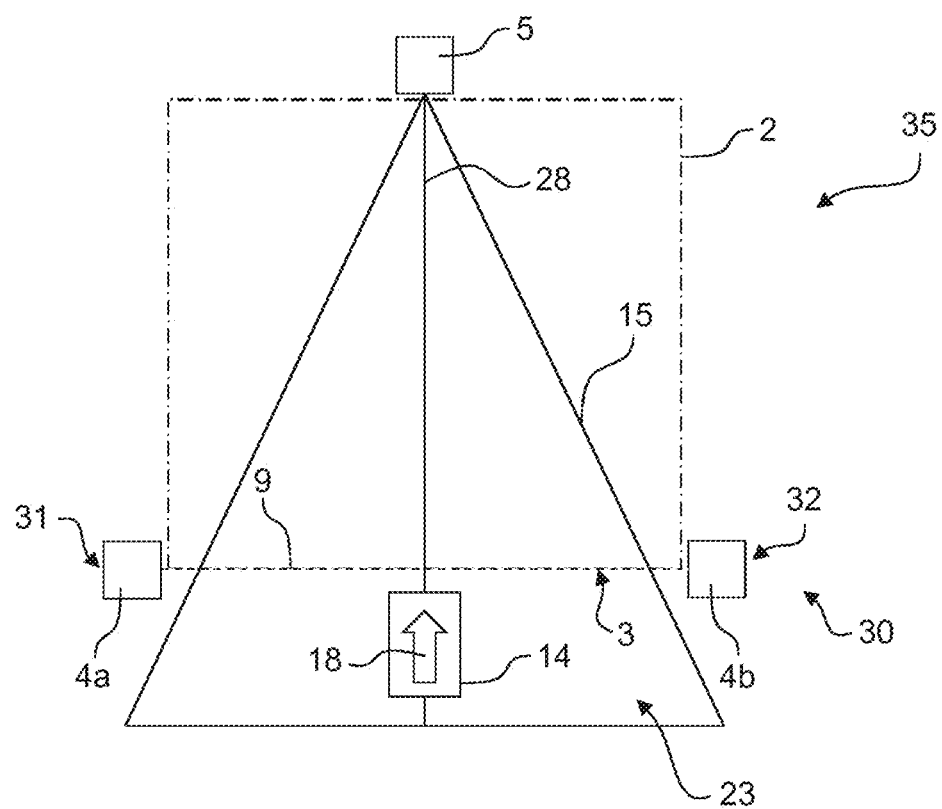
FIG. 8A shows a factory arrangement according to a third embodiment detecting a first object.

FIG. 8A shows a factory arrangement 35 according to a third embodiment. The factory arrangement 35 differs from the factory arrangement 25 according to the second embodiment in that it comprises a monitoring device 30 according to a third embodiment instead of the monitoring device 20 according to the second embodiment. The monitoring device 30 according to the third embodiment differs from the monitoring device 20 according to the second embodiment in that the radar device 5 is not part of a first support element 31 but is rather arranged away therefrom. In particular, the radar device 5 is neither part of the first support element 31 nor of a second support element 32

Namely, the radar device 5 is arranged such that the safety zone 2 is located between the radar device 5 and the boundary section 3 defined by the light curtain device 4. The detection axis 28 of the radar device 5 is perpendicular to the boundary section 3.

In addition to the functions of the monitoring device 20 of the second embodiment (such as the muting and performing of a predetermined protective measure), the monitoring device 30 according to the third embodiment can also detect the material out of which a detected object is made. This material detection is performed by the radar device 5. In the monitoring device 30, the evaluation result is determined as a function of the material property of the detected object.

For example, in FIG. 8A, a cardboard box 14 is approaching the boundary section 3 from outside the safety zone 2. Although the cardboard box 14 is within the alarm zone 23 of the detection region 15, there is no danger because the cardboard box 14 is not a human. Thus, when the monitoring device 30 detects that the box 14 is made of cardboard, no alarm is emitted by the protective device 21. In addition, when the detected object 14 is made of cardboard or of another non-human material, the muting device 22 temporarily deactivates the light curtain device 4 such that the conveyor belt 11 is not turned off when said object touches the boundary section 3.

Figure 8B:
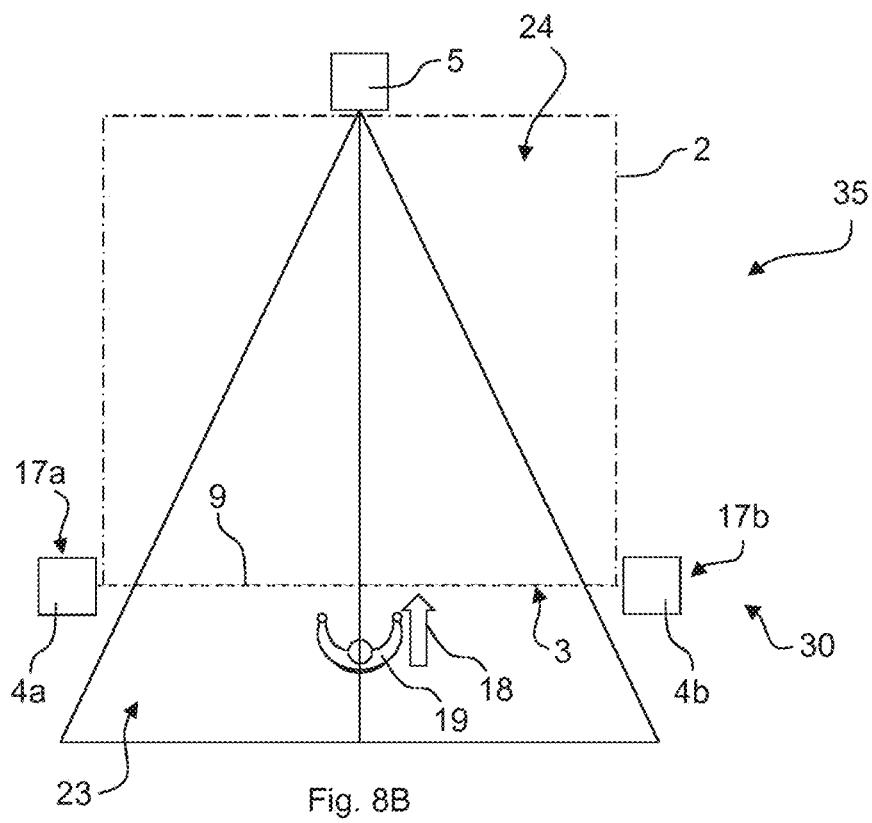
FIG. 8B shows a factory arrangement according to a third embodiment detecting a second object.

In the example of FIG. 8B, a human 19 is approaching the boundary section 3 from the outside of the safety zone 2. The radar device 5 detects that the object is a human 19. Hence, the evaluation result indicates that a human 19 is in the alarm zone 23, thereby indicating that there is a risk of injuring the human 19. In the case that a human 19 is detected, no muting is performed. Instead, the protection device 21 emits a warning signal and if the human 19 touches the boundary section 3, the conveyor belt 11 is further turned off, as described in view of FIGS. 6A and 6B.

Figure 9:
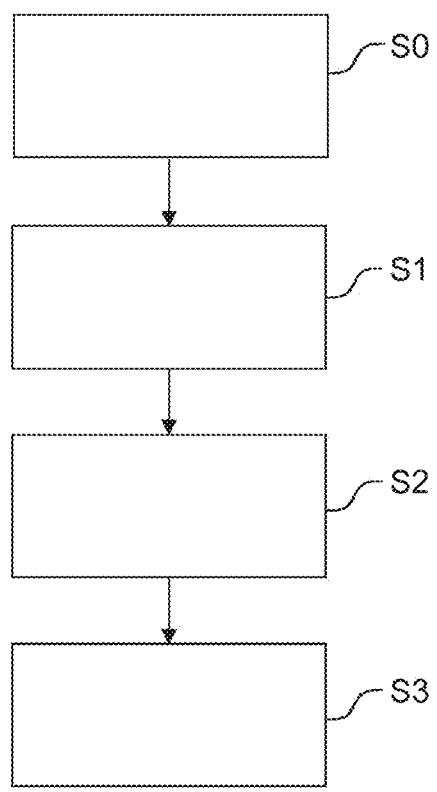
FIG. 9 shows a method for monitoring a boundary section of a safety zone.

FIG. 9 shows a method for monitoring a boundary section 3 of a safety zone 2. In a step S0, the monitoring device 1, 20, 30 is provided. In a step S1, the light curtain device 4 is operated to detect if an object 6, 14, 19 touches the boundary section 3. In a step S2, at least one radar device 5 is contemporaneously operated for detecting a position of the object 6, 14, 19 and/or a movement direction of the object 6, 14, 19 relative to the boundary section 3. In a step S2, an evaluation result is emitted based on a signal from the radar device 5 and optionally based on a signal from the light curtain device 4.

Although the present invention has been described in accordance with preferred embodiments, it is obvious for the person skilled in the art that modifications are possible in all embodiments. For example, the protective measures performed by the protection device 21 can be different and can include the emission of a visual warning signal. The shapes and sizes of the detection region, safety zone, alarm zone and/or muting zone can vary. Different protective measures can be performed by the protection device 21 depending on the material of the detected object, the position of the object and/or its movement direction. The monitoring device 1, 20, 30 can also be used to detect the presence, position and movement direction of several objects at the time and to perform appropriate protective measures.

REFERENCE NUMERALS

1 monitoring device
2 safety zone
3 boundary section
4 light curtain device
4*a* light emitting element
4*b* light receiving element
5 radar device
5*a* radar sender
5*b* radar receiver
6 object
7 evaluation device
8 cable
9 light beam
10 factory arrangement
11 factory device
12 first part
13 second part
14 box
15 detection region
16 first support element
17 second support element
18 direction 19 human
20 monitoring device
21 protection device
22 muting device
23 alarm zone
24 muting zone
25 factory arrangement
26 factory device
27 non-dangerous zone
28 detection axis
30 monitoring device
31 first support element
32 second support element
35 factory arrangement
LDS light curtain device signal
RDS radar device signal
S0-S3 method steps

The invention claimed is:

1. A monitoring device for monitoring a boundary section of a safety zone for detecting an object at least partially entering or leaving the safety zone through the boundary section, comprising:
   a light curtain device for detecting an object touching the boundary section;
   at least one radar device for detecting a movement direction of the object relative to the boundary section and/or a material property of the object; and
   an evaluation device for emitting an evaluation result based on a radar device signal from the radar device and based on a light curtain device signal from the light curtain device.

2. The monitoring device according to claim 1, further comprising a protection device for emitting a warning signal and/or performing a predetermined protective measure based on the evaluation result.

3. The monitoring device according to claim 1, further comprising a muting device for temporarily deactivating the protection device and/or the light curtain device as a function of the evaluation result.

4. The monitoring device according to claim 1, wherein the evaluation result indicates whether the object is inside or outside the safety zone, the movement direction of the object relative to the boundary section as detected by the radar device and/or whether the object is touching the boundary section.

5. The monitoring device according to claim 1, wherein the radar device has a detection region, wherein the radar device and the light curtain device are arranged such that the detection region at least partially overlaps with the boundary section.

6. The monitoring device according to claim 5, wherein the boundary section is covered by the detection region.

7. The monitoring device according to claim 5, wherein the detection region has an elongated shape with a detection axis, and the radar device and the light curtain device are arranged such that the detection axis runs parallel to the boundary section.

8. The monitoring device according to claim 5, wherein the detection region has an elongated shape with a detection axis, and the radar device and the light curtain device are arranged such that the detection axis runs perpendicular to the boundary section.

9. The monitoring device according to claim 1, wherein the light curtain device comprises a plurality of light emitting elements arranged on or at a first support element and a plurality of light receiving elements arranged on or at a second support element, the boundary section being between the support elements.

10. The monitoring device according to claim 9, wherein the radar device comprises a radar sender and a radar receiver, the radar sender and the radar receiver being arranged at or on at least one of the first and/or second support element.

11. The monitoring device according to claim 9, wherein the radar device comprises a radar sender and a radar receiver, the radar sender and the radar receiver being arranged at a predetermined distance from the first and the second support element.

12. The monitoring device according to claim 1, wherein the safety zone is situated between the radar device and the light curtain device.

13. A factory arrangement comprising:
   a safety zone delimited by at least one boundary section, wherein, in the safety zone, at least one factory device is arranged and implemented to perform a predetermined function; and
   a monitoring device according to claim 1, implemented to detect if an object at least partially enters or leaves the safety zone through the boundary section.

14. A method for monitoring a boundary section of a safety zone comprising:
   operating a light curtain device to detect if an object touches the boundary section; and
   contemporaneously operating at least one radar device for detecting a movement direction of the object relative to the boundary section and/or a material property of the object; and
   emitting an evaluation result based on a radar device signal from the radar device and based on a light curtain device signal from the light curtain device.

* * * * *